E. C. BRYHAN.
LEVELING BASE FOR CREAM SEPARATORS.
APPLICATION FILED APR. 12, 1916.
1,210,411. Patented Jan. 2, 1917.
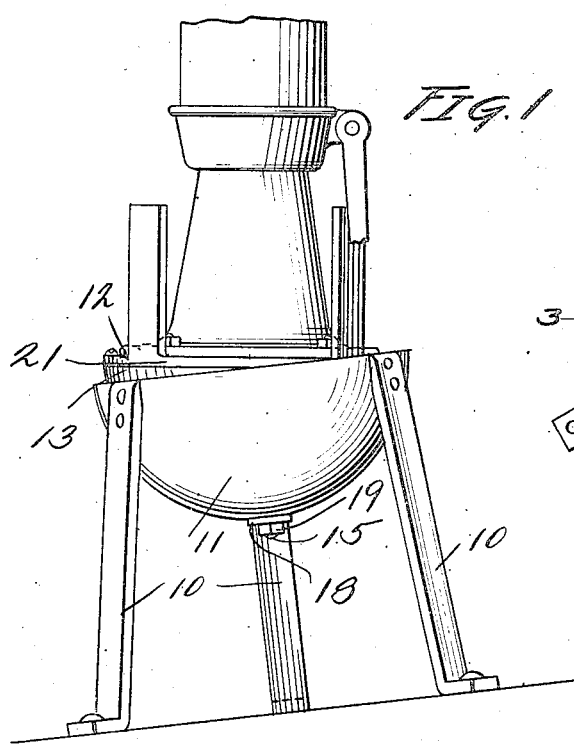
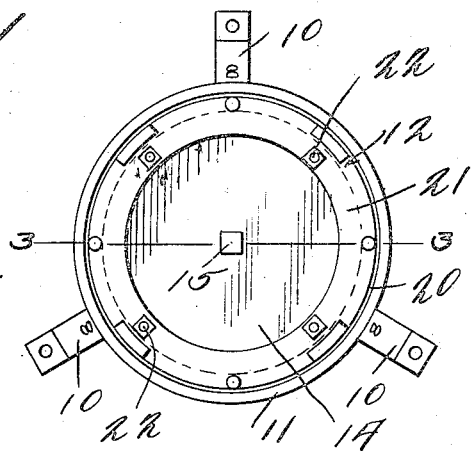
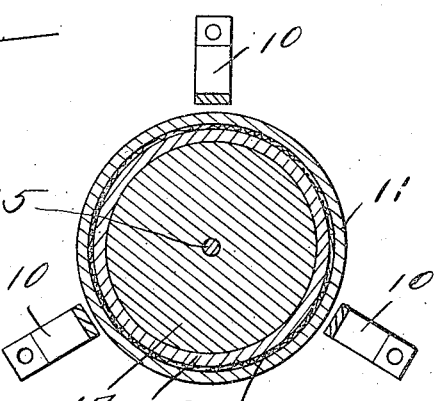
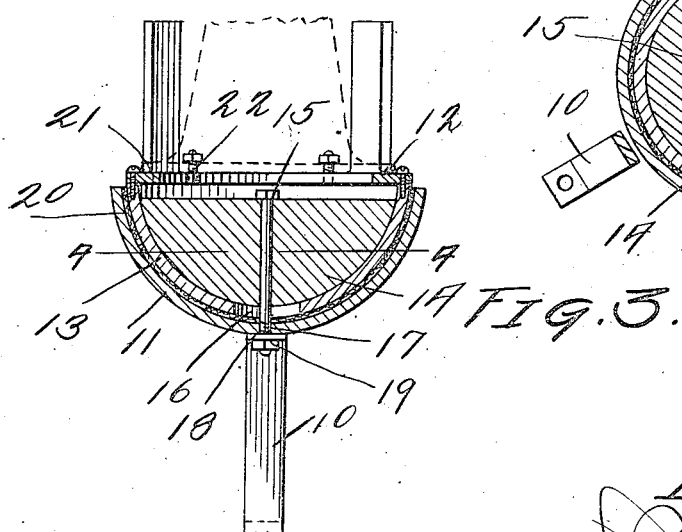
Witnesses
Inventor
E. C. Bryhan
By
Attorneys

UNITED STATES PATENT OFFICE.

ELMER C. BRYHAN, OF LANCASTER, WISCONSIN.

LEVELING-BASE FOR CREAM-SEPARATORS.

1,210,411.  Specification of Letters Patent.  Patented Jan. 2, 1917.

Application filed April 12, 1916. Serial No. 90,755.

*To all whom it may concern:*

Be it known that I, ELMER C. BRYHAN, a citizen of the United States, residing at Lancaster, in the county of Grant, State of Wisconsin, have invented certain new and useful Improvements in Leveling-Bases for Cream-Separators; and I do hereby declare the following to be a full, clear, and exact description of the invention, such as will enable others skilled in the art to which it appertains to make and use the same.

This invention relates to cream separators and more particularly to means for leveling such separators and has for its object to provide a base or support for a separator which will include portions adapted to rest upon the floor and separator receiving portions mounted in such a way that they may be shifted with respect to the floor engaging portions to level the separator or to turn its discharge outlet in any desired direction.

In the drawings: Figure 1 is a side elevation of the present invention in use, the slant of the floor upon which it is employed being considerably exaggerated to more clearly illustrate the structure. Fig. 2 is a top plan of the present structure with the separator removed. Fig. 3 is a vertical section on line 3—3 of Fig. 2. Fig. 4 is a horizontal section on line 4—4 of Fig. 3 looking downwardly.

Referring now to the drawings the present invention includes a plurality of diagonally arranged legs 10 which, at their upper ends are secured against the outer face of a hollow approximately semispherical cup member 11 disposed with its curved portion directed downwardly within the inclosure of the legs, the upper surface of this member being open.

A frame 12 is provided which is shaped to receive the body of a separator therein, and this frame carries a downwardly extending hollow semi-spherical member 13 which is disposed within the cup member 11, and disposed within the member 13 there is a solid semi-spherical clamping member 14. These several members are of such size that they will rest with their mutually adjacent faces in engagement. The clamping member 14 has a bolt 15 passed vertically therethrough and extending downwardly through central openings 16 and 17 in the members 13 and 11 respectively and below the member 11 the bolt is provided with a washer 18 and a clamping nut 19. It will be seen that this nut may be operated to clamp the member 14 against the member 13 to hold the latter immovable between the members 14 and 11. As illustrated, the opening 16 of the member 13 is considerably larger in all directions than the bolt 15 so that, when the nut 19 is loosened the frame 12, with the member 13, may be rocked laterally or may be revolved with the bolt as a center. Thus, regardless of the level of the surface upon which the legs 10 may be disposed, the frame may be shifted into a vertical position. Its movement being limited only by the engagement of the sides of the opening 16 with the bolt, since the cup member 11 is slightly less than semi-spherical and terminates short of the upper edge of the member 13. By this means a separator may be disposed in the frame 12 and may be made perfectly vertical, or it may be shifted to direct its outlet in any direction.

The frame 12 is formed separate from the member 13, and is connected thereto by means of a circular flange 21 carried by the frame at the bottom thereof, and screwed or otherwise removably secured to the upper edge of the member 13. This flange extends inwardly, to support the separator, as shown, and has upwardly extending stud screw 22, which may be engaged through opening in the base flange of a separator. If a cylindrical separator is used, it may be fitted within the frame 12, as will be understood. The fact that the flange is removable makes it possible to place the member 14 in position.

Packing material 20, is disposed between the members 11 and 13, to assure a firm grip.

What is claimed is:

In a device of the kind described, a tripod consisting of an upwardly opening semispherical bowl provided with a triplicity of legs fixed to its exterior adjacent its edge and projecting below its bottom, a semispherical packing lining said bowl, a second semispherical bowl resting on the lining and having a centrally disposed opening, the first bowl and packing being provided with similar smaller openings, a substantially semispherical member fitting the second bowl, a bolt passing through said member and said openings, a nut on said bolt to draw said member, bowls and lining together, and a retaining ring screwed to the edge of the second bowl and serving to prevent accidental separation of the member from the second bowl.

In testimony whereof, I affix my signature, in the presence of two witnesses.

ELMER C. BRYHAN.

Witnesses:
FRANK C. MEYER,
ANNA E. MEYSEMBOURG.